(12) United States Patent
Saddi et al.

(10) Patent No.: US 8,131,038 B2
(45) Date of Patent: Mar. 6, 2012

(54) SYSTEM AND METHOD FOR GLOBAL-TO-LOCAL SHAPE MATCHING FOR AUTOMATIC LIVER SEGMENTATION IN MEDICAL IMAGING

(75) Inventors: Kinda Anna Saddi, Oxford (GB); Mikael Rousson, Malmo (SE)

(73) Assignee: Siemens Aktiengesellschaft, München (DE)

( * ) Notice: Subject to any disclaimer, the term of this patent is extended or adjusted under 35 U.S.C. 154(b) by 877 days.

(21) Appl. No.: 12/189,276

(22) Filed: Aug. 11, 2008

(65) Prior Publication Data

US 2009/0052756 A1   Feb. 26, 2009

Related U.S. Application Data (60) Provisional application No. 60/957,026, filed on Aug. 21, 2007.

(51) Int. Cl.
*G06K 9/00* (2006.01)

(52) U.S. Cl. .................................................. 382/128

(58) Field of Classification Search .................. 382/128, 382/199

See application file for complete search history.

(56) References Cited

U.S. PATENT DOCUMENTS

| | | | |
|---|---|---|---|
| 7,079,674 B2 * | 7/2006 | Paragios et al. | 382/128 |
| 2008/0018646 A1 * | 1/2008 | Farag et al. | 345/424 |

OTHER PUBLICATIONS

Andy Tsai, et al., "A Shape-Based Approach to the Segmentation of Medical Imagery Using Level Sets," pp. 137-154, IEEE Transaction of Medical Imaging, vol. 22, No. 2, Feb. 2003.

C. Chefd'hotel, et al., "Flows of Diffeomorphisms for Multimodal Image Registration."

Gary E. Christensen, et al., "Deformable Templates Using Large Deformation Kinematics," pp. 14351447, IEEE Transactions of Image Processing, vol. 5, No. 10, Oct. 1996.

(Continued)

*Primary Examiner* — Clayton E Laballe
*Assistant Examiner* — Noam Reisner
(74) *Attorney, Agent, or Firm* — Donald B. Paschburg; F. Chau & Associates, LLC (57) ABSTRACT

A method for automatically segmenting a liver in digital medical images includes providing a 3-dimensional (3D) digital image I and a set of N training shapes $\{\phi_i\}_{i=1,\ldots,N}$ for a liver trained from a set of manually segmented images, selecting a seed point to initialize the segmentation, representing a level set function $\phi_\alpha(\theta x+h)$ of a liver boundary $\Gamma$ in the image as

$$\phi_\alpha(x) = \phi_0 + \sum_{i=1}^{n} \alpha_i V_i(x),$$

where $$\phi_0(x) = \frac{1}{N} \sum_{i=1}^{N} \phi_i(x)$$

is a mean shape, $\{V_i(x)\}_{i=1,\ldots,n}$ are eigenmodes where n<N, $\alpha_i$ are shape parameters, and $h \in R^3$ and $\theta \in [0,2\pi]^3$ are translation and rotation parameters that align the training shapes, minimizing a first energy functional to determine the shape, translation, and rotation parameters to determine a shape template for the liver segmentation, defining a second energy functional of the shape template and a registration mapping weighted by image intensity histogram functions inside and outside the boundary, and minimizing the second energy functional to determine the registration mapping, where the registration mapping recovers local deformations of the liver.

23 Claims, 5 Drawing Sheets

OTHER PUBLICATIONS

Mikael Rousson, et al., "Efficient Kernel Density Estimation of Shape and Intensity Priors for Level Set Segmentation," pp. 757-764, Palms Springs, Oct. 2005. LNCS vol. 3750.

Kinda Anna Saddi, et al., "Region-Based Segmentation Via Non-Rigid Template Matching."

Rachid Deriche, "Recursively Implementing the Gaussian and Its and Derivatives," No. 1893, Programme 4, Robotique, Image at Vision.

* cited by examiner

| Method | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| A | 63 | 81 | 75 | 83 | 21 | 68 | 79 | 63 | 74 | 61 | 76 | 79 | 65 | 73 | 82 | 54 | 81 | 63 | 63 | 79 |
| B | 58 | 79 | 73 | 81 | 16 | 68 | 75 | 63 | 73 | 62 | 74 | 78 | 65 | 74 | 81 | 54 | 78 | 65 | 58 | 75 |
| C | 58 | 79 | 72 | 81 | 19 | 68 | 75 | 64 | 73 | 63 | 74 | 76 | 67 | 74 | 81 | 55 | 78 | 66 | 57 | 76 |

FIG. 1

| Method | Overlap Error [%] | Score | Volume Diff. [%] | Score | Avg. Dist [mm] | Score | RMS Dist [mm] | Score | Max. Dist. [mm] | Score | Total Score |
|---|---|---|---|---|---|---|---|---|---|---|---|
| A | 7.6 | 70 | 3.0 | 84 | 1.3 | 65 | 2.9 | 57 | 24.4 | 68 | 69 |
| B | 9.7 | 62 | 3.3 | 82 | 1.6 | 56 | 3.1 | 54 | 25.8 | 66 | 64 |
| C | 9.6 | 62 | 4.7 | 75 | 1.8 | 52 | 3.9 | 43 | 29.7 | 61 | 59 |

FIG. 2

| Dataset | Overlap Error [%] | Score | Volume Diff. [%] | Score | Avg. Dist [mm] | Score | RMS Dist [mm] | Score | Max. Dist. [mm] | Score | Total Score |
|---|---|---|---|---|---|---|---|---|---|---|---|
| 1 | 6.3 | 76 | 3.1 | 84 | 1.0 | 75 | 2.2 | 69 | 17.0 | 78 | 76 |
| 2 | 9.6 | 62 | -3.2 | 83 | 1.6 | 60 | 3.9 | 46 | 37.2 | 51 | 60 |
| 3 | 11.4 | 56 | 2.6 | 86 | 2.3 | 42 | 4.8 | 33 | 34.2 | 55 | 54 |
| 4 | 10.5 | 59 | 0.0 | 100 | 2.0 | 51 | 4.3 | 40 | 32.7 | 57 | 61 |
| 5 | 7.6 | 70 | -2.4 | 87 | 1.5 | 63 | 3.4 | 53 | 33.9 | 55 | 66 |
| 6 | 8.5 | 67 | -3.2 | 83 | 1.6 | 60 | 4.1 | 43 | 43.9 | 42 | 59 |
| 7 | 8.6 | 67 | 7.2 | 62 | 1.3 | 68 | 3.4 | 53 | 26.0 | 66 | 63 |
| 8 | 6.4 | 75 | -3.9 | 79 | 1.1 | 72 | 2.5 | 66 | 23.2 | 70 | 72 |
| 9 | 9.4 | 63 | 7.7 | 59 | 1.2 | 71 | 2.9 | 60 | 20.6 | 73 | 65 |
| 10 | -10.9 | 57 | 4.4 | 77 | 1.6 | 61 | 3.1 | 56 | 24.0 | 68 | 64 |
| Average | 8.9 | 65 | 3.8 | 80 | 1.5 | 62 | 3.4 | 52 | 29.3 | 62 | 64 |

SYSTEM AND METHOD FOR GLOBAL-TO-LOCAL SHAPE MATCHING FOR AUTOMATIC LIVER SEGMENTATION IN MEDICAL IMAGING

CROSS REFERENCE TO RELATED UNITED STATES APPLICATIONS

This application claims priority from "Global-to-Local Shape Matching for Liver Segmentation in CT Imaging", U.S. Provisional Application No. 60/957,026 of Saddi, et al., filed Aug. 21, 2007, the contents of which are herein incorporated by reference in their entireties.

TECHNICAL FIELD

This disclosure is directed to liver segmentation in digital medical images.

DISCUSSION OF THE RELATED ART

Medical computer-aided diagnosis based on computed tomography (CT) has gained significant attention. Such a procedure typically requires the extraction of anatomical structures. In particular, current methods for liver diagnosis involve its boundary extraction. This task is quite challenging because the liver tissue and other adjacent organs are characterized by very similar densities (Hounsfield units) in CT images. Moreover, partial-volume effects make the observation of intensity discontinuities challenging, resulting in weak edges. To resolve this lack of information, shape models can be employed, but again, challenges arise due to the large inter-patient liver shape variability.

While most liver segmentation tools available to clinicians still require a time-consuming human interaction, there have been proposals to automate this process to make it more usable in clinical applications. One technique uses a cascading segmentation framework that sequentially detects different hepatic structures for surgery planning where the liver is extracted by deforming globally and locally a given template. Another technique uses a probabilistic atlas to classify voxel intensities in abdominal CT images. More recently, a trend toward the use of 3D shape models has emerged. One example built a statistical shape model composed of 43 segmented livers and used a modified Active Shape Model (ASM) for segmentation. A similar approach used a shape constrained deformable model rather than the usual ASM fitting approach. This allowed capturing shape variations that were not present in the training set. A detailed validation shows the improvement in accuracy with respect to ASM. This illustrates that relying too much on a prior shape model gives robust segmentation algorithms but generally has low accuracy. This is due to the large inter-patient shape variability of the liver which cannot be modeled from a reduced number of training samples. In practice, each liver shape has a particular geometry, and only global shape characteristics remain consistent from one patient to another.

SUMMARY OF THE INVENTION

Exemplary embodiments of the invention as described herein generally include methods and systems for a two-phase segmentation of the liver in CT images. First, the pose and global shape properties are estimated using a statistical shape model defined in a low dimensional space spanned by a training set of shapes. The shape-based step allows estimation of the pose and the global shape properties of the liver with good robustness. Then, a template matching procedure is applied to recover local deformations that were not present in the learning set. This non-rigid shape matching can recover local shape properties. In addition to a global regularization on the shape, a non-rigid template registration method according to an embodiment of the invention can preserve the topology of the liver even for large shape variations. Both of these steps are formulated in a variational framework that optimizes the same image term: the likelihood of the intensity inside the region of interest and its background. A method according to an embodiment of the invention is initialized using a single point inside the liver that can be found automatically. This global-to-local strategy can recover livers with peculiar shapes in arbitrary poses. Results are presented on wide range of images, some with problematic attributes like developed tumors.

According to an aspect of the invention, there is provided a method for automatically segmenting a liver in digital medical images, including providing a 3-dimensional (3D) digital image I to be segmented, the image comprising a plurality of intensities associated with a 3D grid of points, providing a set of N training shapes $\{\phi_i\}_{i=1,\ldots,N}$ for a liver trained from a set of manually segmented images, selecting a seed point to initialize the segmentation, representing a level set function $\phi_\alpha(\theta x+h)$ of a liver boundary $\Gamma$ in the image as $$\phi_\alpha(x) = \phi_0 + \sum_{i=1}^{n} \alpha_i V_i(x),$$

where $$\phi_0(x) = \frac{1}{N} \sum_{i=1}^{N} \phi_i(x)$$

is a mean shape, $\{V_i(x)\}_{i=1,\ldots,n}$ are eigenmodes where n<N, $\alpha_i$ are shape parameters corresponding to each training shape $\phi_i$, and $h \in R^3$ and $\theta \in [0,2\pi]^3$ are translation and rotation parameters that align the training shapes, defining a first energy functional in terms of the level set functions $\phi_\alpha(\theta x+h)$, minimizing the first energy functional to determine the shape, translation, and rotation parameters, where the shape, translation, and rotation parameters determine a shape template for the liver segmentation, defining a second energy functional of the shape template and a registration mapping weighted by image intensity histogram functions inside and outside the boundary, and minimizing the second energy functional to determine the registration mapping, where the registration mapping recovers local deformations of the liver.

According to a further aspect of the invention, the first energy functional is $$E(\alpha, h, \theta) = -\int_\Omega \binom{H(\phi_\alpha(\theta x + h))\log p_{in}(I(x)) +}{(1 + H(\phi\alpha(\theta x + h)))\log p_{out}(I(x))} dx - \log\left(\frac{1}{\sqrt{2\pi} N\sigma} \sum_{i=1}^{N} \exp\left(-\frac{(\alpha - \alpha_i)^2}{2\sigma}\right)\right)$$

where H is a Heaviside function whose value is 1 inside the boundary and 0 otherwise, the log term is a shape prior distribution with standard deviation $\sigma$, and $p_{in}$, $p_{out}$ are image intensity histogram functions inside and outside the boundary, respectively.

According to a further aspect of the invention, the method includes setting σ to twice an average Euclidean distance between each training shape and its closest neighbor in a subspace with dimension n.

According to a further aspect of the invention, minimizing the first energy functional comprising initializing the shape parameters $\alpha_i$ to a mean shape, and solving $$\begin{cases} \dfrac{d\alpha}{dt} = \int_\Omega \delta(\phi_\alpha(\theta x + h)) V(\theta x + h) e(x) dx + \dfrac{1}{\sigma^2} \dfrac{\sum_{i=1}^N (\alpha_i - \alpha) K_i}{\sum_{i=1}^N K_i} \\ \dfrac{dh}{dt} = \int_\Omega \delta(\phi_\alpha(\theta x + h)) \nabla \phi_\alpha(\theta x + h) e(x) dx \\ \dfrac{d\theta}{dt} = \int_\Omega \delta(\phi_\alpha(\theta x + h)) (\nabla \phi_\alpha(\theta x + h) \cdot \nabla_\theta \theta x) e(x) dx \end{cases}$$

with a finite difference scheme, where δ is a Dirac delta function, $$e(x) = \log\left[\dfrac{p_{out}(I(x))}{p_{in}(I(x))}\right], \quad K_i = \dfrac{1}{\sqrt{2\pi}} \exp\left(-\dfrac{(\alpha - \alpha_i)^2}{2\sigma^2}\right),$$

and $$V = (V_1, \ldots, V_{in}),$$

and restricting computations to a narrow band around a zero crossing of $\phi_\alpha$.

According to a further aspect of the invention, the second energy functional is $$E_{data}(I_T \circ \psi) = -\int_\Omega ((I_T \circ \psi) \log_{in} p(I(x)) + (1 - I_T \circ \psi) \log p_{out}(I(x))) dx,$$

where $\psi: \Omega \to \Omega$ is a registration transformation on a domain Ω of the image I, $I_T(X) = H(\phi_\alpha(\theta x + h))$, $I_T \circ \psi$ is a warped binary template, ∘ is the composition operator, and $p_{in}$, $p_{out}$ are the image intensity histogram functions inside and outside the boundary, respectively.

According to a further aspect of the invention, minimizing the second energy functional comprises building a sequence of transformations $(\psi_k)_{k=0, \ldots, +\infty}$ that approximate ψ by composition of small displacements.

$$\psi_{k+1} = \psi_k \circ (\psi_{id} + \beta v_k),$$

where $\psi_k$ is initialized to $\psi_0 = \psi_{id}$, the registration identity transformation, $v_k$ is a velocity vector field defined from $$v = \nabla (I_T \cdot \psi) \left( \log \dfrac{p_{in}(I(x))}{p_{out}(I(x))} \right),$$

and β is a displacement coefficient.

According to a further aspect of the invention, the method includes regularizing $v_k$ with a recursive Gaussian filter.

According to a further aspect of the invention, the method includes adjusting the value of β to an inverse of a maximum norm of the vector field $v_k$.

According to a further aspect of the invention, the method includes computing $$p_{in}(i) = \dfrac{1}{|\Omega_{in}|} \int_\Omega (I_T \cdot \psi) \delta(I(x) - i) dx,$$

$$p_{out}(i) = \dfrac{1}{|\Omega_{out}|} \int_\Omega (1 - I_T \cdot \psi) \delta(I(x) - i) dx,$$

inside and outside the boundary, where δ is a Dirac delta function, i is an image intensity value and $|\Omega_{in}|$, $|\Omega_{out}|$ are volumes of corresponding domains inside and outside the boundary.

According to a further aspect of the invention, the method includes embedding the minimization of the second energy functional in a coarse-to-fine strategy, where a coarse resolution solution from one step is used to initialize a finer resolution solution at a next step.

According to a further aspect of the invention, n is determined by analyzing the eigenvalues to include those eigenmodes that contribute a predetermined percentage to the level set function $\phi_\alpha$.

According to a further aspect of the invention, selecting a seed point comprises computing an intensity histogram of the image, fitting a Gaussian mixture distribution to the intensity histogram to compute a mask corresponding to a liver intensity, convolving the mask with a Gaussian kernel with a standard deviation proportional to a size of the liver, and selecting a pixel with a highest response the seed point.

According to another aspect of the invention, there is provided a program storage device readable by a computer, tangibly embodying a program of instructions executable by the computer to perform the method steps for automatically segmenting a liver in digital medical images.

DETAILED DESCRIPTION OF EXEMPLARY EMBODIMENTS

Exemplary embodiments of the invention as described herein generally include systems and methods for liver segmentation in digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Statistical Region-Based Model

Let I:$\Omega \to R$ be the image to segment. One defines $p_{in}(i)$ and $p_{out}(i)$ as the probability density functions of a random variable modeling intensity values i=I(x) in the regions $\Omega_{in}$ and $\Omega_{out}$ inside and outside the liver, respectively. Given this model, the optimal closed boundary $\Gamma$ can be obtained using a maximum likelihood principle, minimizing the following energy:

$$E_{data}(\Gamma) = -\int_\Omega (\chi(x,\Gamma)\log p_{in}(I(x)) + (1-\chi(x,\Gamma))\log p_{out}(I(x)))dx \quad (1)$$

where shape function $\chi(x,\Gamma)=1$ if x is inside $\Gamma$ and 0 otherwise.

In a level set framework, the evolving contour $\Gamma$ is represented as the zero level line of a signed function $\phi:\Omega \to R$, i.e. $\Gamma = \{x \in \Omega | \phi(x)=0\}$. Letting H($\phi$) be the Heaviside function, $$H(\phi) = \begin{cases} 1, & \text{if } \phi \geq 0, \\ 0, & \text{otherwise}, \end{cases}$$

the energy to be minimized can be expressed as follows:

$$E(\phi) = -\int_\Omega [H(\phi)\log p_{in}(I(x)) + (1-H(\phi))\log p_{out}(I(x)) + v|\nabla H(\phi)|]dx,$$

where $v|\nabla H(\phi)|$ is a regularization term on the contour length. This energy is typically minimized by gradient descent. For this purpose, one defines a time dependent family of functions $t \mapsto \phi(t)$ solutions of the following PDE:

$$\frac{\partial E(\phi)}{\partial t} = \delta(\phi)\left(\log\frac{p_{in}(I(x))}{p_{out}(I(x))} + vdiv\left(\frac{\nabla \phi}{|\nabla \phi|}\right)\right)$$

that corresponds to an evolution of the contour $\Gamma$. The first term accounts for the intensity likelihood for each region. The second term is the regularization of the contour.

There are different strategies to minimize this energy and obtain a region segmentation. A direct solution is to evolve the above level set representation of the boundary but, as is seen in the experimental results presented below, this has several drawbacks. According to an embodiment of the invention, an alternative minimization comprises first constraining $\Gamma$ with a given shape model and then using a template registration formulation to locally refine the solution. The intensity distributions $p_{in}(i)$ and $p_{out}(i)$ are estimated dynamically during the optimization process according to the intensity histograms inside each region for fixed positions of the boundary.

Shape Model

According to an embodiment of the invention, the boundary $\Gamma$ can be constrained by a shape model trained from a set of manually segmented images. Given a set of N training shapes encoded by their signed distance functions $\{\phi_i\}_{i=1,\ldots,N}$, the segmentation task can be reduced to a finite-dimensional optimization by constraining the task to the subspace spanned by the training shapes.

Given a distance d on the space of signed distance functions defined by $d^2(\phi_i, \phi_j) = \int_\Omega (\phi_i(x) - \phi_j(x))^2 dx$, the set of training shapes is aligned with respect to translation and rotation. $\Gamma$ is defined as the zero crossing of a level set function $\phi$ defined in the image domain. The level set representation $\phi$ of the boundary $\Gamma$ is then constrained to a parametric representation of the form:

$$\phi_\alpha(\theta x + h) = \phi_0(\theta x + h) + \sum_{i=1}^n \alpha_i V_i(\theta x + h), \quad (2)$$

where $$\phi_0(x) = \frac{1}{N}\sum_{i=1}^N \phi_i(x)$$

represents the mean shape, $\{V_i(x)\}_{i=1,\ldots,n}$ are the eigenmodes, and n<N is the dimension of the subspace spanned by the N training shapes. The parameter vector $\alpha=(\alpha_1,\ldots,\alpha_n)$ models the shape deformations, while the parameters h $\in R^3$ and $\theta \in [0,2\pi]^3$ model translation and rotation of the shape.

One way to choose the value of n is by examining the eigenvalues of the corresponding eigenvectors. In some sense, the size of each eigenvalue indicates the amount of influence or importance its corresponding eigenvector has in determining the shape. One could determine the threshold for determining the value of n by looking at a histogram of the eigenvalues and selecting those eigenvalues that contribute most to the shape. However, this approach would be challenging to implement as the threshold value for n varies for each application. There is no universal n that can be set.

Each training shape $\phi_i$ can be represented by its corresponding shape vector $\alpha_i$. Statistical shape learning infers a statistical distribution P($\alpha$) from these sample shapes, using a nonparametric density approximation:

$$P(\alpha) = \frac{1}{N\sigma\sqrt{2\pi}}\sum_{i=1}^N \exp\left(-\frac{(\alpha-\alpha_i)^2}{2\sigma^2}\right). \quad (3)$$

Constraining the boundary $\Gamma$ to this subspace, $\Gamma$ car be represented by a shape vector $\alpha$, i.e. $\Gamma$ is the zero crossing of the level set function $\phi_\alpha$. According to an embodiment of the invention, $\sigma$ can be set to twice the average of the Euclidean distance between each training shape and its closest neighbor in the subspace with dimension n. Every training shape is a vector of dimension n that represent the number of variation modes.

One can express the shape function $\chi(\theta x+h, \Gamma)$ in terms of the Heaviside function H as $H(\phi_\alpha(\theta x+h))$. Using the short hand $H_\phi=H(\phi_\alpha(\theta x+h))$, EQ. (1) can be rewritten as:

$$E_{data}(\alpha,h,\theta)=-\int_\Omega(H_\phi \log p_{in}(I(x))+(1-H_\phi)\log p_{out}(I(x)))dx. \quad (4)$$

Incorporating the prior on the distribution of the shape vector $\alpha$ in the energy leads to a final criteria:

$$E(\alpha,h,\theta)=-\log P(\alpha)+E_{data}(\alpha,h,\theta). \quad (5)$$

This energy can be minimized using alternated gradient descents with respect to each unknown parameters $\alpha$, h and $\theta$ to solve for $\alpha$, h and $\theta$. With $$e(x) = \log\left[\frac{p_{in}(I(x))}{p_{out}(I(x))}\right],$$

$$K_i = \frac{1}{\sqrt{2\pi}}\exp\left(-\frac{(\alpha-\alpha_i)^2}{2\sigma^2}\right)$$

and $V=(V_1,\ldots,V_n)$, the following system of coupled gradient descent equations is obtained:

$$\begin{cases} \frac{d\alpha}{dt} = \int_\Omega \delta(\phi_\alpha(\theta x+h))V(\theta x+h)e(x)dx + \frac{1}{\sigma^2}\frac{\sum_{i=1}^N(\alpha_i-\alpha)K_i}{\sum_{i=1}^N K_i} \\ \frac{dh}{dt} = \int_\Omega \delta(\phi_\alpha(\theta x+h))\nabla\phi_\alpha(\theta x+h)e(x)dx \\ \frac{d\theta}{dt} = \int_\Omega \delta(\phi_\alpha(\theta x+h))(\nabla\phi_\alpha(\theta x+h)\cdot\nabla_\theta\theta x)e(x)dx \end{cases} \quad (6)$$

These equations can be solved by initializing the shape $\alpha$ with the mean shape ($\alpha=0$) and the transformation parameters h and $\theta$ with some reasonable estimates. Subsequently, the above partial differential equations are discretized by a finite difference scheme. Note that in all equations, the Dirac delta function $\delta$ appears as factor inside the integrals over the image domain. This allows restricting all computations to a narrow band around the zero crossing of $\phi$. While the evolution of translation and pose parameters h and $\theta$ are merely driven by the data term e(x), the shape vector a is additionally drawn towards each training shape with a strength that decays exponentially with the distance to the respective shape.

Template Matching

According to an embodiment of the invention, a template matching algorithm that recovers local deformations of the shape obtained in the previous section can be used to refine the segmentation. Consider a registration framework, in which the template matching can be formulated as finding a transformation $\psi:\Omega\to\Omega$ that minimizes the cost functional $E_{data}(I_T\circ\psi)$ defined in EQ. (1), where $I_T(x)=\chi(x,\Gamma)=H(\phi_\alpha(\theta x+h))$ is the shape represented by a binary template obtained from EQ. (5). Thus, the following energy is minimized to find $\psi$:

$$E_{data}(I_T\circ\psi)=-\int_{106}((I_T\circ\psi)\log_{in}p(I(x))+(1-I_T\circ\psi)\log p_{out}(I(x)))dx. \quad (7)$$

In this equation, $I_T\circ\psi$ is the warped binary template and $\circ$ the composition operator. Since $I_T$ has been obtained by solving EQ. 5, it is desired to find an optimal transformation $\psi$. The derivation of the energy leads to the following gradient descent:

$$\frac{\partial E_{data}(I_T\cdot\psi)}{\partial\psi} = \nabla(I_T\cdot\psi)\left(\log\frac{p_{in}(I(x))}{p_{out}(I(x))}\right) \quad (8)$$

In non-rigid registration, deriving this energy according to a high-dimensional transformation results in a vector field $$v = \nabla(I_T\cdot\psi)\left(\log\frac{p_{in}(I(x))}{p_{out}(I(x))}\right).$$

To guarantee a well-posed problem, this vector field should be regularized.

To find an optimal high-dimensional transformation, one builds a sequence of transformations $(\psi_k)_{k=0,\ldots,+\infty}$, by composition of small displacements, $$\psi_{k+1}=\psi_k\circ(\psi_{id}+\beta v_k), \psi_0=\psi_{id}, \quad (9)$$

where $\psi_{id}$ is the identity transformation, $v_k$ is a velocity vector field that follows the gradient of the cost functional to be minimized, and $\beta$ is a displacement coefficient whose value can be adjusted to insure small displacements. The maximum displacement should be less than one pixel. To insure this, the maximum norm of the vector field $v_k$ is computed, the vector field is normalized by this maximum norm, and $\beta$ is the inverse of the maximum norm. The gradient $v_k$ can be regularized using a fast recursive filtering technique that approximates a Gaussian smoothing.

The iterative scheme for EQ. (9) is repeated until convergence, and can be seen as a discretization (via a Taylor expansion) of a transport equation in an Eulerian frame:

$$\frac{\partial\psi_t}{\partial t} = -D\psi_t\cdot v, \psi_0=\psi_{id}. \quad (10)$$

where $D\psi_t$ stands for the Jacobian matrix of $\psi_t$. Here, large deformations are possible because the regularization is applied to the velocity rather than the deformation, as is the case with evolving the level set representation.

The PDFs of the object and the background are computed during each iteration of the registration process. The template image $I_T$ determines the inside of the region of interest and its background. The equations are:

$$p_{in}(i) = \frac{1}{|\Omega_{in}|}\int_\Omega (I_T\cdot\psi)\delta(I(x)-i)dx, \quad (11)$$

$$p_{out}(i) = \frac{1}{|\Omega_{out}|}\int_\Omega (1-I_T\cdot\psi)\delta(I(x)-i)dx,$$

where i is an image intensity and $|\Omega_{in}|$, $|\Omega_{out}|$ are the volumes of the corresponding domains.

Implementation

Figure 5A:
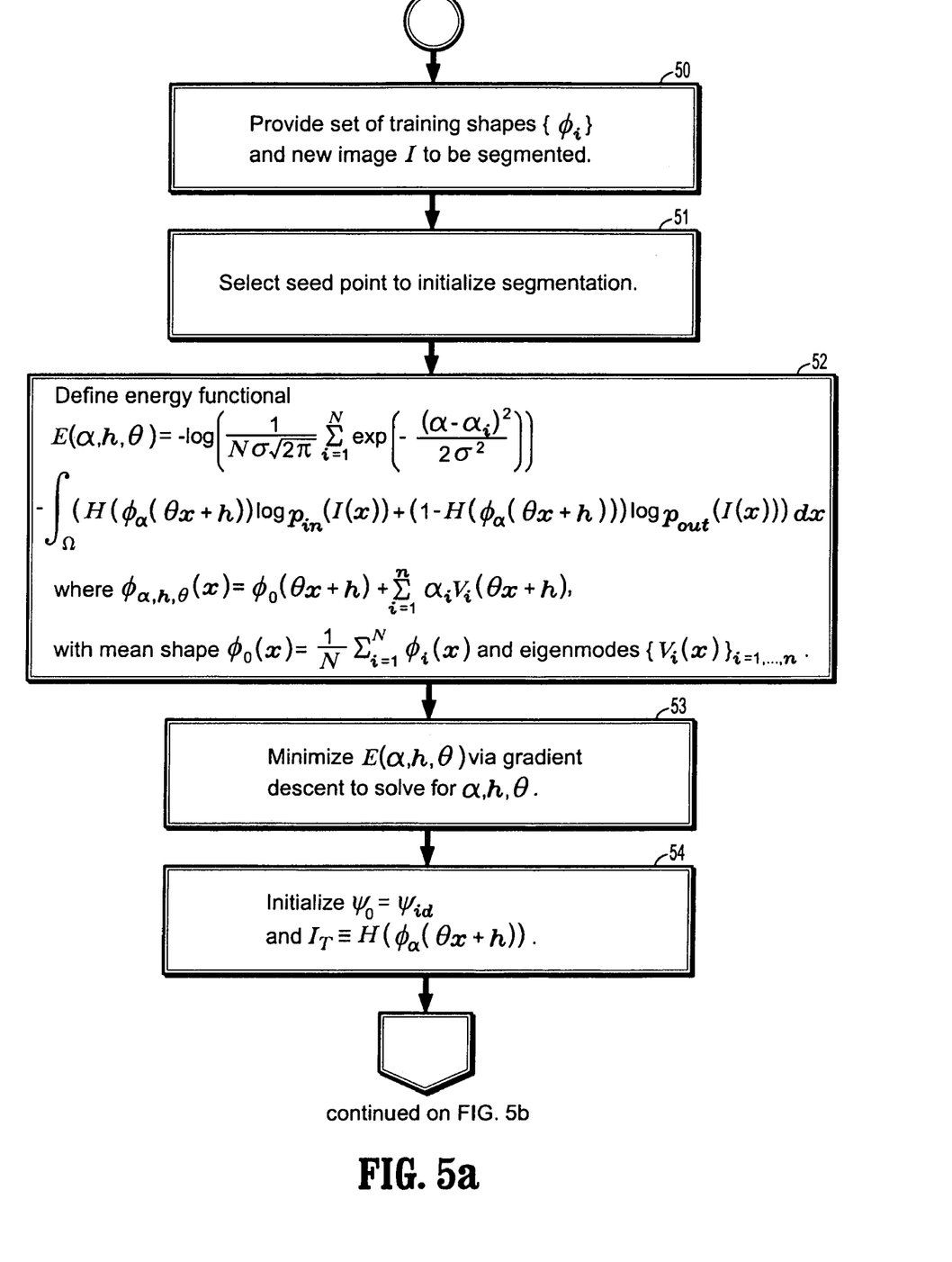
FIGS. 5a-b is a flowchart of a method for liver segmentation in digital medical images, according to an embodiment of the invention.
Figure 5B:
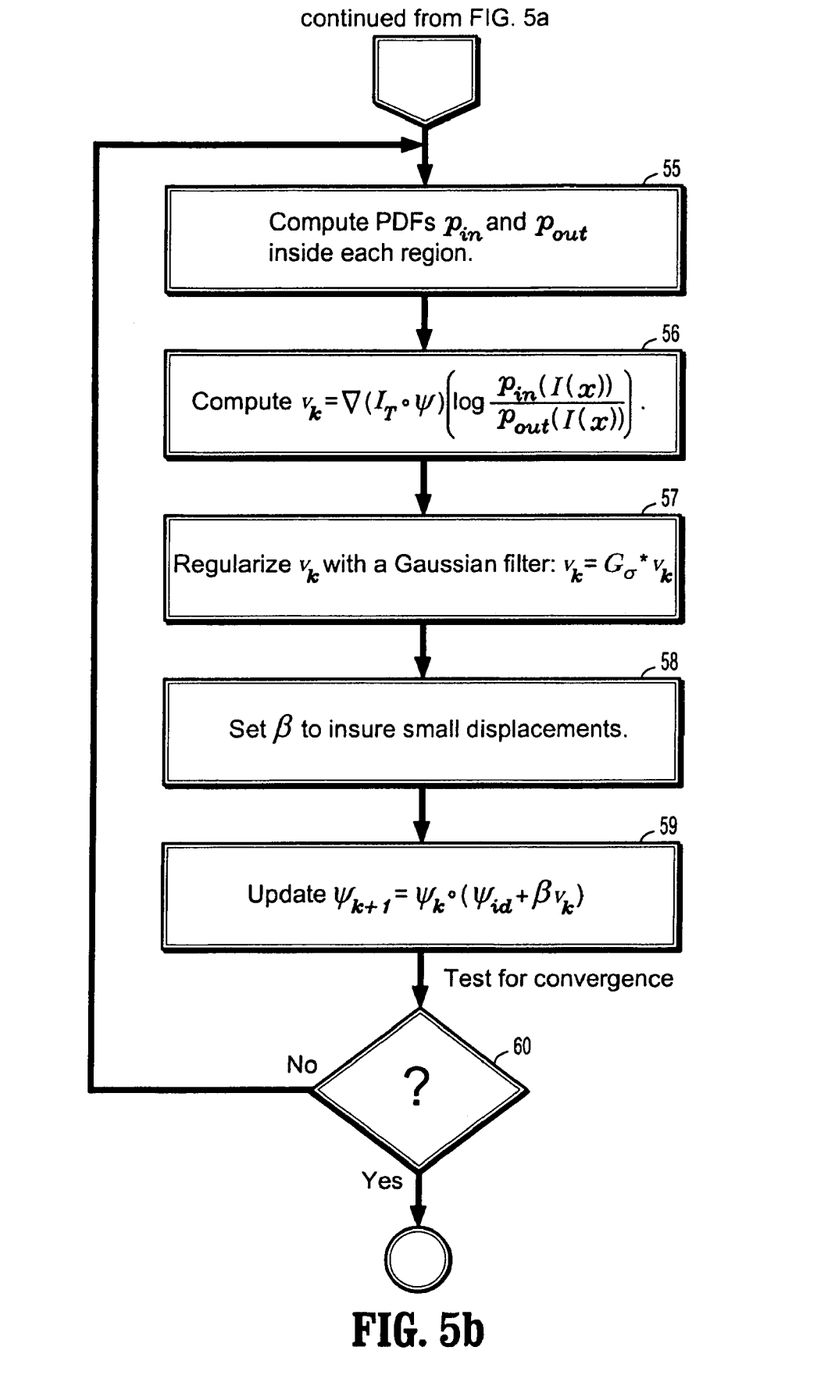

A flowchart of a method for liver segmentation in digital medical images is shown in FIGS. 5a-b. Referring now to FIG. 5a, a method according to an embodiment of the invention begins at step 51 by providing a set of N training shapes $\{\phi_i\}_{i=1,\ldots,N}$ trained from a set of manually segmented images, and a new image I to be segmented.

At step 51, the segmentation is automatically initialized. A point inside the liver can be found as follows: first compute an intensity histogram of the image to be segmented, then fit a Gaussian Mixture distribution to the intensity histogram. By doing so one can compute a mask corresponding to the liver intensity. This binary image is then convolved with a Gaussian kernel with a standard deviation proportional to the liver size. The pixel with the highest response is found and selected as the initialization point of the liver segmentation. This single point is sufficient for the initialization and does not have to be the center of mass.

At step 52, the energy functional $$E(\alpha, h, \theta) = -\int_{\Omega}\binom{H(\phi_\alpha(\theta x + h))\log p_{in}(I(x)) +}{(1 + H(\phi\alpha(\theta x + h)))\log p_{out}(I(x))}dx - \log\left(\frac{1}{\sqrt{2\pi}N\sigma}\sum_{i=1}^{N}\exp\left(-\frac{(\alpha - \alpha_i)^2}{2\sigma^2}\right)\right)$$

is defined in terms of the training shapes and that incorporating shape prior information, where H is a Heaviside function of the training shapes incorporating translation parameters $h \in R^3$ and rotation parameters $\theta \in [0,2\pi]^3$ that align the training shapes. In this energy functional, the training shapes are used to represent the level set representation $\phi$ of the boundary $\Gamma$ as $$\phi_\alpha(x) = \phi_0 + \sum_{i=1}^{n}\alpha_i V_i(x),$$

with mean shape $$\phi_0(x) = \frac{1}{N}\sum_{i=1}^{N}\phi_i(x)$$

and eigenmodes $\{V_i(x)\}_{i=1,\ldots,n}$. This energy functional is minimized at step 53 using alternating gradient descents using EQS. (6) to yield values for $\theta$, h, and $\alpha$. At step 54, the resulting regions functions $H_\phi = H(\phi_\alpha(\theta x+h))$ are used to initialize a binary template $I_T$, and an incremental registration mapping $\psi_0 = \psi_{id}$ is initialized to the identity transformation.

Moving on to FIG. 5b, the probability distribution functions (PDFs) $p_{in}$ and $p_{out}$ are computed at step 55 for the regions inside and outside the boundary $\Gamma$. At step 56, the vector field obtained from the variational gradient, $$v_k = \nabla(I_T \cdot \psi)\left(\log\frac{p_{in}(I(x))}{p_{out}(I(x))}\right),$$

is computed, and is regularized with a Gaussian filter $v_{k=G\sigma}*v_k$, where "*" represents convolution at step 57. The displacement coefficient $\beta$ is set at step 58 to a value based on the maximum norm of the vector field $v_k$, as described above, that insures small displacements, and the incremental registration displacement is updated at step 59 as $\psi_{k+1} = \psi_k \circ (\psi_{id} + \beta v_k)$. At step 60, if the transformations $\psi_k$ have converged, or a maximum number of iterations have been reached, the process terminates, otherwise, steps 55 to 59 are repeated. The resulting transformation $\psi$ recovers local deformations and minimizes the cost functional $E_{data}(I_T \circ \psi)$ defined in EQ. (1).

The region statistics are computed dynamically at step 55 as the algorithm iterates. The probability density functions $p_{in}$ and $p_{out}$ are based on intensity histograms and are described by EQS. 11. According to an embodiment of the invention, a smooth version of the template $I_T$ was used, where values vary between 0 and 255, with the contour at 127.

A regularization of the vector field $v_k$ according to an embodiment of the invention is performed at step 57 using the Deriche's recursive filter, which has a linear complexity with respect to the number of voxels. A Deriche filter is an approximation of the Gaussian filtering. It is a separable filter that is composed of three sub-filters, one for every direction, which are applied one after the other. Every sub-filter is recursive using a second order exponential approximation.

An algorithm according to an embodiment of the invention is embedded in a coarse-to-fine strategy, where coarser solutions are propagated back up in the multi-resolution hierarchy. This reduces the computational cost by working with less data at lower resolutions. This also allows recovering large displacements, and helps avoiding local minima. According to an embodiment of the invention five levels of multi-resolutions were used.

Although a method according to an embodiment of the invention has been described in terms of CT images, methods according to other embodiments of the invention can be applied by those of skill in the art to images acquired from other modalities, such as magnetic resonance imaging, ultrasound, etc.

Experimental Results

To quantify the segmentation accuracy, results obtained from a method according to an embodiment of the invention were compared to a ground-truth. These experiments examined 30 CT images (data provided by MICCAI Workshop on 3D Segmentation) that have been manually segmented by radiological experts, working slice-by-slice in transversal view. A segmentation is defined as the entire liver including all internal structures. Among these images, twenty segmentations are available for training. The other ten images are used for testing. All images are enhanced with contrast agent and most of them are pathological.

In an approach according to an embodiment of the invention, the shape model is composed of 50 segmented livers, including the 20 training images described above. An algorithm according to an embodiment of the invention has proven robust to the initialization point. According to an embodiment of the invention, 30 modes of variation are used for the shape model. For the template matching, an exemplary, non-limiting regularization parameter value for $\sigma$ is 2.0, and exemplary, non-limiting values for the number of iterations for the multi-resolution are, from high to low resolution, 0, 16, 32, 48 and 16.

Segmentation results are compared to the ground-truth using five metrics: the volumetric overlap, the relative absolute volume difference, the average symmetric absolute surface distance, the symmetric RMS surface distance and the maximum symmetric absolute surface distance. These metrics are evaluated by assigning a score to each test case (for details see http://mbi.dkfz-heidelberg.de/grand-challenge2007/sites/eval.htm). The score of each test case itself is the average of five scores, each scaled from 0 to 100. The maximum score is 100, and will only be obtained when the segmentation is exactly the same as the reference.

Figure 1:
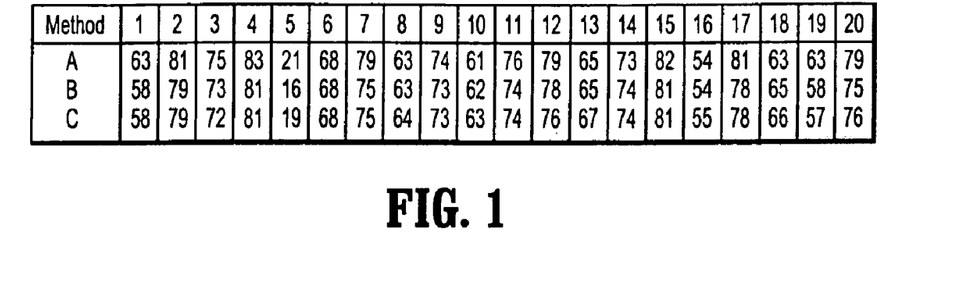
FIG. 1 is a table showing the segmentation comparison scores for every image in the training set for each of the segmentation methods being compared, according to an embodiment of the invention.
Figure 2:
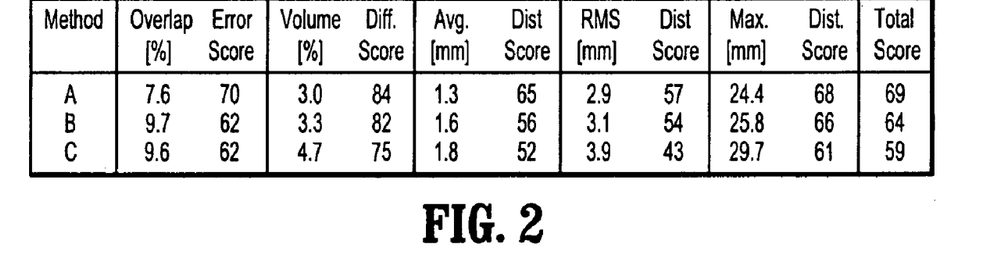
FIG. 2 is a table illustrating the average metrics and scores of the segmentation methods being compared, according to an embodiment of the invention.

An approach according to an embodiment of the invention (Method A) was also compared to two alternatives. The first alternative uses the shape model fitting described above followed by an unconstrained level set evolution (Method B). The second alternative uses the mean shape of the liver as initialization and template matching (Method C). These three methods were applied to the training images. FIG. 1 is a table showing the score for every image in the training set for each of methods A, B, and C, where the numbers in bold correspond to the highest score. The table shown in FIG. 2 illustrates the average metrics and corresponding average scores on the 20 training cases for methods A, B, and C. The table of FIG. 2 indicates that an approach according to an embodiment of the invention gives overall better quantitative results than the other two. Contrary to the level set approach (Method B), an approach according to an embodiment of the invention applies the regularization to the deformation field. This allows segmentation of irregular shapes, that would be impossible with surface evolution techniques. The regularization is decorrelated from the intrinsic geometry of the template, which allows recovery of irregular shapes while avoiding leaks.

Figure 3:
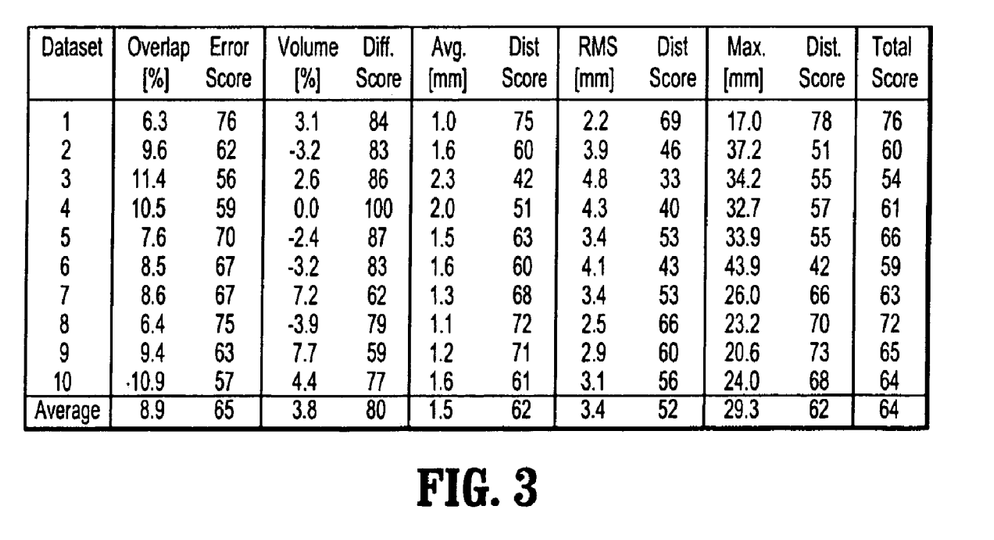
FIG. 3 is a table showing the metrics and the scores compared to the ground-truth for all test cases, according to an embodiment of the invention.
Figure 4:
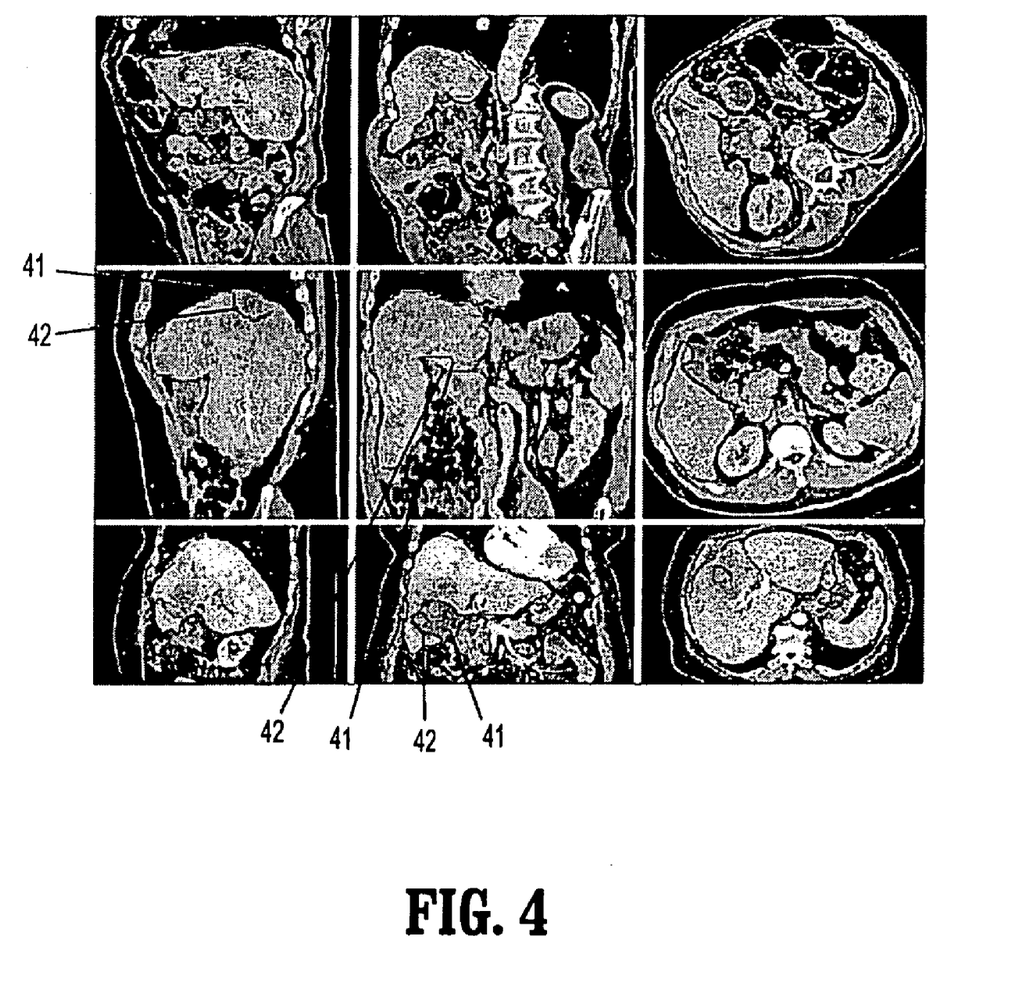
FIG. 4 depicts the results of three different segmentations in three different views, according to an embodiment of the invention.

An approach according to an embodiment of the invention was validated on 10 test cases, which were not included in the shape model. The table of FIG. 3 shows the metrics and the scores compared to the ground-truth for all ten test cases. FIG. 4 shows the results of three different segmentations. Referring now to the figure, the top row depicts, from left to right, a sagittal, coronal and transversal slice from a relatively easy case, the middle row depicts the corresponding slices for an average case, and the bottom row depicts the corresponding slices for a relatively difficult case. The outline of the reference standard segmentation for selected figures is indicated by reference number 41, and the outline of the segmentation of a method according to an embodiment of the invention for the selected figures is indicated by reference number 42. For the sake of clarity, only those segmentation results that differed most clearly were indicated by the reference numbers.

An approach according to an embodiment of the invention scores 76 points for the easy case, which means that it performed roughly as good as a human. The lowest score is 54 and corresponds to an image with a tumor, which is considered as a hard case. Since an algorithm according to an embodiment of the invention relies on the intensity distribution inside the liver, it cannot include the whole tumor in the segmentation.

Approximate computation time is 324 seconds per image in average on a 2 GHz dual-core Intel processor. This can be reduced if necessary for clinical applications if lower accuracy is acceptable.

System

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
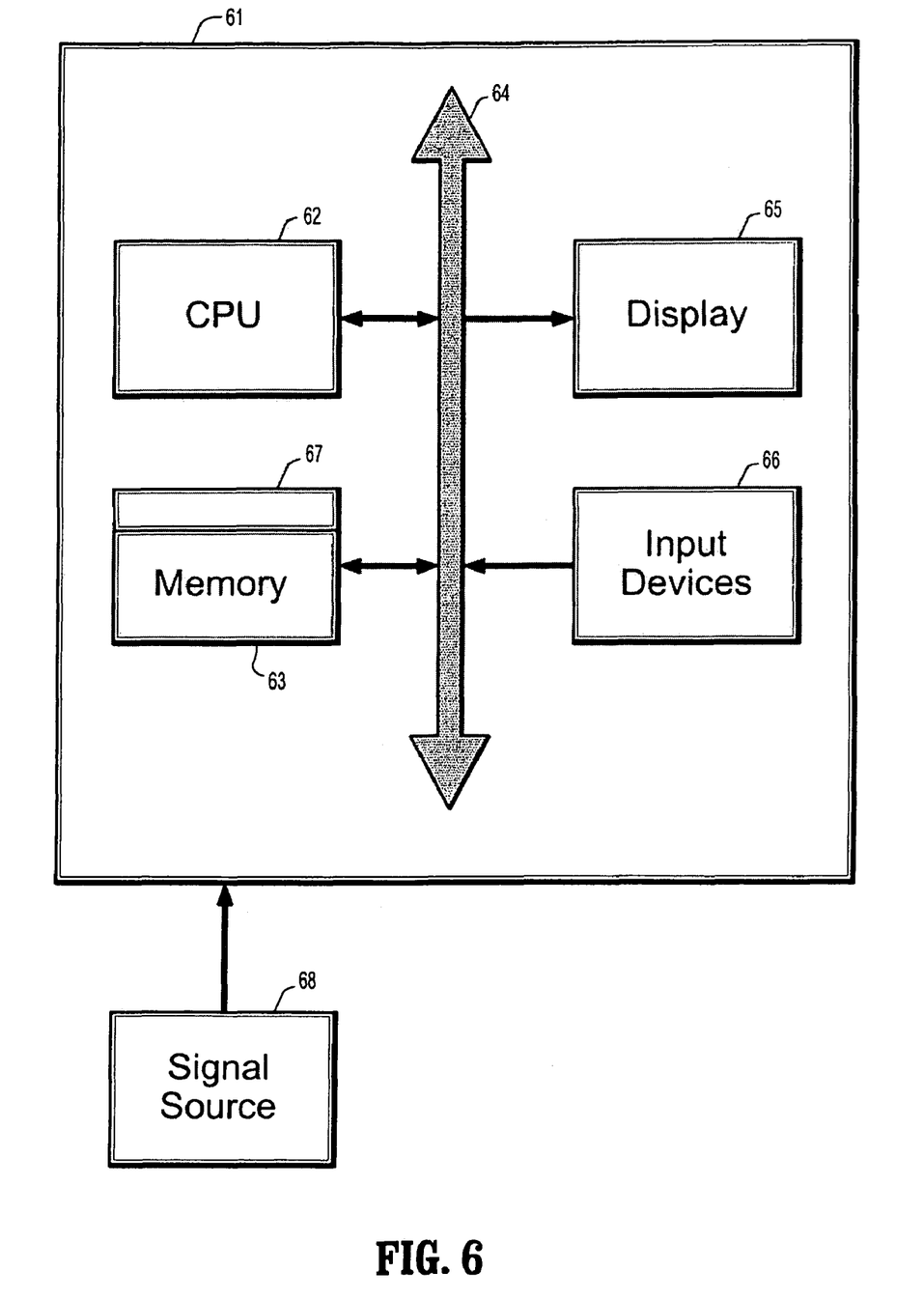
FIG. 6 is a block diagram of an exemplary computer system for implementing a method for liver segmentation in digital medical images, according to an embodiment of the invention.

FIG. 6 is a block diagram of an exemplary computer system for implementing a method for liver segmentation in digital medical images, according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for automatically segmenting a liver in digital medical images, comprising the steps of:

providing a 3-dimensional (3D) digital image I to be segmented, said image comprising a plurality of intensities associated with a 3D grid of points;

providing a set of N training shapes $\{\phi_i\}_{i=1,\ldots,N}$ for a liver trained from a set of manually segmented images;

selecting a seed point to initialize said segmentation;

representing a level set function $\phi_\alpha(\theta x+h)$ of a liver boundary $\Gamma$ in said image as $$\phi_\alpha(x) = \phi_0 + \sum_{i=1}^{n} \alpha_i V_i(x), \text{ wherein } \phi_0(x) = \frac{1}{N}\sum_{i=1}^{N} \phi_i(x)$$

is a mean shape, $\{V_i(x)\}_{i=1,\ldots,n}$ are eigenmodes wherein n<N, $\alpha_i$ are shape parameters corresponding to each training shape $\phi_i$, and $h \in R^3$ and $\theta \in [0,2\pi]^3$ are translation and rotation parameters that align said training shapes;

defining a first energy functional in terms of said level set functions $\phi_\alpha(\theta x+h)$, wherein said first energy functional is $$E(\alpha, h, \theta) = -\int_\Omega \binom{H(\phi_\alpha(\theta x + h))\log p_{in}(I(x)) +}{(1 + H(\phi\alpha(\theta x + h)))\log p_{out}(I(x))} dx - \log\left(\frac{1}{\sqrt{2\pi}\,N\sigma}\sum_{i=1}^{N} \exp\left(-\frac{(\alpha - \alpha_i)^2}{2\sigma^2}\right)\right)$$

wherein H is a Heaviside function whose value is 1 inside said boundary and 0 otherwise, the log term is a shape prior distribution with standard deviation $\sigma$, and $p_{in}$, $p_{out}$ are image intensity histogram functions inside and outside said boundary, respectively;

minimizing said first energy functional to determine said shape, translation, and rotation parameters, wherein said shape, translation, and rotation parameters determine a shape template for said liver segmentation;

defining a second energy functional of said shape template and a registration mapping weighted by image intensity histogram functions inside and outside said boundary;

minimizing said second energy functional to determine said registration mapping, wherein said registration mapping recovers local deformations of said liver; and setting σ to twice an average Euclidean distance between each training shape and its closet neighbor in a subspace with dimension n.

2. The method of claim 1, wherein minimizing said first energy functional comprising initializing said shape parameters $\alpha_i$ to a mean shape, and solving $$\begin{cases} \frac{d\alpha}{dt} = \int_\Omega \delta(\phi_\alpha(\theta x + h))V(\theta x + h)e(x)\,dx + \frac{1}{\sigma^2}\frac{\sum_{i=1}^N (\alpha_i - \alpha)K_i}{\sum_{i=1}^N K_i} \\ \frac{dh}{dt} = \int_\Omega \delta(\phi_\alpha(\theta x + h))\nabla\phi_\alpha(\theta x + h)e(x)\,dx \\ \frac{d\theta}{dt} = \int_\Omega \delta(\phi_\alpha(\theta x + h))(\nabla\phi_\alpha(\theta x + h)\cdot\nabla_\theta\theta x)e(x)\,dx \end{cases}$$

with a finite difference scheme, wherein δ is a Dirac delta function, $$e(x) = \log\left[\frac{p_{out}(I(x))}{p_{in}(I(x))}\right],$$

$$K_i = \frac{1}{\sqrt{2\pi}}\exp\left(-\frac{(\alpha - \alpha_i)^2}{2\sigma^2}\right),$$

and $$V = (V_1, \ldots, V_n), \text{ and}$$

restricting computations to a narrow band around a zero crossing of $\phi_\alpha$.

3. The method of claim 1, wherein said second energy functional is $$E_{data}(I_T \circ \psi) = -\int_\Omega ((I_T \circ \psi)\log_{in} p(I(x)) + (1 - I_T \circ \psi)\log p_{out}(I(x)))\,dx,$$

wherein $\psi:\Omega\to\Omega$ is a registration transformation on a domain Ω of said image I, $$I_T(x) = H(\phi_\alpha(\theta x + h)), \quad I_T \circ \psi$$

is a warped binary template, ∘ is the composition operator, and $p_{in}$, $p_{out}$ are said image intensity histogram functions inside and outside said boundary, respectively.

4. The method of claim 3, wherein minimizing said second energy functional comprises building a sequence of transformations $(\psi_k)_{k=0,\ldots,+\infty}$ that approximate ψ by composition of small displacements, $$\psi_{k+1} = \psi_k \circ (\psi_{id} + \beta v_k),$$

wherein $\psi_k$ is initialized to $\psi_0 = \psi_{id}$, the registration identity transformation, $v_k$ is a velocity vector field defined from $$v = \nabla(I_T \circ \psi)\left(\log\frac{p_{in}(I(x))}{p_{out}(I(x))}\right),$$

and β is a displacement coefficient.

5. The method of claim 4, further comprising regularizing $v_k$ with a recursive Gaussian filter.

6. The method of claim 4, further comprising adjusting the value of β to an inverse of a maximum norm of said vector field $v_k$.

7. The method of claim 4, further comprising computing $$p_{in}(i) = \frac{1}{|\Omega_{in}|}\int_\Omega (I_T \circ \psi)\delta(I(x) - i)\,dx,$$

$$p_{out}(i) = \frac{1}{|\Omega_{out}|}\int_\Omega (1 - I_T \circ \psi)\delta(I(x) - i)\,dx,$$

inside and outside said boundary wherein δ is a Dirac delta function, i is an image intensity value and $|\Omega_{in}|$, $|\Omega_{out}|$ are volumes of corresponding domains inside and out outside said boundary.

8. The method of claim 4, further comprising embedding said minimization of said second energy functional in a coarse-to-fine strategy, wherein a coarse resolution solution from one step is used to initialize a finer resolution solution at a next step.

9. The method of claim 1, wherein n is determined by analyzing the eigenvalues to include those eigenmodes that contribute a predetermined percentage to said level set function $\phi_\alpha$.

10. A method for automatically segmenting a liver in digital medical images, comprising the steps of:

providing a 3-dimensional (3D) digital image I to be segmented, said image comprising a plurality of intensities associated with a 3D grid of points;

providing a set of N training shapes $\{\phi_i\}_{i=1,\ldots,N}$ for a liver trained from a set of manually segmented images;

selecting a seed point to initialize said segmentation;

representing a level set function $\phi_\alpha(\theta x + h)$ of a liver boundary Γ in said image as $$\phi_\alpha(x) = \phi_0 + \sum_{i=1}^n \alpha_i V_i(x),$$

wherein $$\phi_0(x) = \frac{1}{N}\sum_{i=1}^N \phi_i(x)$$

is a mean shape, $\{V_i(x)\}_{i=1,\ldots,n}$ are eigenmodes wherein n<N, $\alpha_i$ are shape parameters corresponding to each training shape $\phi_i$, and $h \in R^3$ and $\theta \in [0,2\pi]^3$ are translation and rotation parameters that align said training shapes; and minimizing a first energy functional $$E_{data}(I_T \circ \psi) = -\int_\Omega ((I_T \circ \psi) \log_{in} p(I(x)) + (1 - I_T \circ \psi) \log p_{out}(I(x))) dx,$$

to solve for ψ by building a sequence of transformations $(\psi_k)_{k=0,\ldots,+\infty}$ that approximate ψ by composition of small displacements, $$\psi_{k+1} = \psi_k \circ (\psi_{id} + \beta v_k),$$

wherein ψ:Ω→Ω is a registration transformation on a domain Ω of said image I, $$I_T(x) = H(\phi_\alpha(\theta x + h)),$$

H is a Heaviside function whose value is 1 inside said boundary and 0 otherwise, $I_T \circ \phi$ is a warped binary template, ○ is the composition operator, and $p_{in}$, $p_{out}$ are image intensity histogram functions inside and outside said boundary, respectively, $v_k$ is a velocity vector field defined as $$v = \nabla (I_T \circ \psi)\left(\log \frac{p_{in}(I(x))}{p_{out}(I(x))}\right),$$

and β is a displacement coefficient.

11. The method of claim 10, wherein $\psi_k$ is initialized to $\psi_0 = \psi_{id}$, the registration identity transformation.

12. The method of claim 10, further comprising minimizing a second energy functional $E(\alpha,h,\theta) = -\int_\Omega (H(\phi_\alpha(\theta x + h))) \log P_{in}(I(x)) + (1 + H)\phi\alpha(\theta x + h))) \log P_{out}(I(x)))dx$ $$E(\alpha, h, \theta) = -\int_\Omega \begin{pmatrix} H(\phi_\alpha(\theta x + h))\log p_{in}(I(x)) + \\ (1 - H(\phi\alpha(\theta x + h)))\log p_{out}(I(x)) \end{pmatrix} dx - \log\left(\frac{1}{\sqrt{2\pi} N\sigma}\sum_{i=1}^{N}\exp\left(-\frac{(\alpha-\alpha_i)^2}{2\sigma^2}\right)\right)$$

with respect to α, θ, and h, wherein $I_T(x) = H (\phi_\alpha(\theta x+h))$ is obtained.

13. The method of claim 10, wherein selecting a seed point comprises:
computing an intensity histogram of said image;
fitting a Gaussian mixture distribution to the intensity histogram to compute a mask corresponding to a liver intensity;
convolving said mask with a Gaussian kernel with a standard deviation proportional to a size of said liver; and
selecting a pixel with a highest response said seed point.

14. A non-transitory program storage device readable by a computer, tangibly embodying a program of instructions executable by the computer to perform the method steps for automatically segmenting a liver in digital medical images, said method comprising the steps of:
providing a 3-dimensional (3D) digital image I to be segmented, said image comprising a plurality of intensities associated with a 3D grid of points;
providing a set of N training shapes $\{\phi_i\}_{i=1,\ldots,N}$ for a liver trained from a set of manually segmented images;
selecting a seed point to initialize said segmentation;
representing a level set function $\phi_\alpha(\theta x+h)$ of a liver boundary Γ in said image as $$\phi_\alpha(x) = \phi_0 + \sum_{i=1}^{n}\alpha_i V_i(x),$$

wherein $$\phi_0(x) = \frac{1}{N}\sum_{i=1}^{N}\phi_i(x)$$

is a mean shape, $\{V_i(x)\}_{i=1,\ldots,n}$ are eigenmodes wherein n<N, $\alpha_i$ are shape parameters corresponding to each training shape $\phi_i$, and $h \in R^3$ and $\theta \in [0.2\pi]^3$ are translation and rotation parameters that align said training shapes;

defining a first energy functional in terms of said level set functions $\phi_\alpha(\theta x+h)$;

minimizing said first energy functional to determine said shape, translation, and rotation parameters, wherein said shape, translation, and rotation parameters determine a shape template for said liver segmentation;

defining a second energy functional of said shape template and a registration mapping weighted by image intensity histogram functions inside and outside said boundary; and minimizing said second energy functional to determine said registration mapping, wherein said registration mapping recovers local deformations of said liver, wherein n is determined by analyzing the eigenvalues to include those eigenmodes that contribute a predetermined percentage to said level set function φα.

15. The computer readable program storage device of claim 14, wherein said first energy functional is $E(\alpha,h,\theta) = -\int_\Omega (H(\phi_\alpha(\theta x+h)) \log P_{in}(I(x)) + (1+H(\phi\alpha(\theta x+h)))\log P_{out}(I(x)))dx$ $$E(\alpha, h, \theta) = -\int_\Omega \begin{pmatrix} H(\phi_\alpha(\theta x + h))\log p_{in}(I(x)) + \\ (1 - H(\phi\alpha(\theta x + h)))\log p_{out}(I(x)) \end{pmatrix} dx - \log\left(\frac{1}{\sqrt{2\pi} N\sigma}\sum_{i=1}^{N}\exp\left(-\frac{(\alpha-\alpha_i)^2}{2\sigma^2}\right)\right)$$

wherein H is a Heaviside function whose value is 1 inside said boundary and 0 otherwise, the log term is a shape prior distribution with standard deviation σ, and $p_{in}$, $p_{out}$ are image intensity histogram functions inside and outside said boundary, respectively.

16. The computer readable program storage device of claim 15, the method further comprising setting σ to twice an average Euclidean distance between each training shape and its closest neighbor in a subspace with dimension n.

17. The computer readable program storage device of claim 15, wherein minimizing said first energy functional comprising initializing said shape parameters $\alpha_i$ to a mean shape, and solving $$\begin{cases} \frac{d\alpha}{dt} = \int_\Omega \delta(\phi_\alpha(\theta x+h))V(\theta x+h)e(x)dx + \frac{1}{\sigma^2}\frac{\sum_{i=1}^N (\alpha_i-\alpha)K_i}{\sum_{i=1}^N K_i} \\ \frac{dh}{dt} = \int_\Omega \delta(\phi_\alpha(\theta x+h))\nabla\phi_\alpha(\theta x+h)e(x)dx \\ \frac{d\theta}{dt} = \int_\Omega \delta(\phi_\alpha(\theta x+h))(\nabla\phi_\alpha(\theta x+h)\cdot\nabla_\theta\theta x)e(x)dx \end{cases}$$

with a finite difference scheme, wherein δ is a Dirac delta function, $$e(x) = \log\left[\frac{p_{out}(I(x))}{p_{in}(I(x))}\right],$$

$$K_i = \frac{1}{\sqrt{2\pi}}\exp\left(-\frac{(\alpha-\alpha_i)^2}{2\sigma^2}\right),$$

and $$V = (V_1, \ldots, V_n), \text{ and}$$

restricting computations to a narrow band around a zero crossing of $\phi_\alpha$.

18. The computer readable program storage device of claim 14, wherein said second energy functional is $$E_{data}(I_T\circ\psi) = -\int_\Omega ((I_T\circ\psi)\log_{in}p(I(x))+(1-I_T\circ\psi)\log p_{out}(I(x))))dx,$$

wherein $\psi:\Omega\to\Omega$ is a registration transformation on a domain $\Omega$ of said image I, $$I_T(x) = H(\phi_\alpha(\theta x+h)), \quad I_T\circ\psi$$

is a warped binary template, ∘ is the composition operator, and $p_{in}$, $p_{out}$ are said image intensity histogram functions inside and outside said boundary, respectively.

19. The computer readable program storage device of claim 18, wherein minimizing said second energy functional comprises building a sequence of transformations $(\psi_k)_{k=0,\ldots,+\infty}$ that approximate ψ by composition of small displacements, $$\psi_{k+1} = \psi_k \circ (\psi_{id}+\beta v_k),$$

wherein $\psi_k$ is initialized to $\psi_0=\psi_{id}$, the registration identity transformation, $v_k$ is a velocity vector field defined from $$v = \nabla(I_T\circ\psi)\left(\log\frac{p_{in}(I(x))}{p_{out}(I(x))}\right),$$

and β is a displacement coefficient.

20. The computer readable program storage device of claim 19, the method further comprising regularizing $v_k$ with a recursive Gaussian filter.

21. The computer readable program storage device of claim 19, the method further comprising adjusting the value of β to an inverse of a maximum norm of said vector field $v_k$.

22. The computer readable program storage device of claim 19, the method further comprising computing $$p_{in}(i) = \frac{1}{|\Omega_{in}|}\int_\Omega (I_T\circ\psi)\delta(I(x)-i)dx,$$

$$p_{out}(i) = \frac{1}{|\Omega_{out}|}\int_\Omega (1-I_T\circ\psi)\delta(I(x)-i)dx,$$

inside and outside said boundary, wherein δ is a Dirac delta function, i is an image intensity value and $|\Omega_{in}|$, $|\Omega_{out}|$ are volumes of corresponding domains inside and outside said boundary.

23. The computer readable program storage device of claim 19, the method further comprising embedding said minimization of said second energy functional in a coarse-to-fine strategy, wherein a coarse resolution solution from one step is used to initialize a finer resolution solution at a next step.

\* \* \* \* \*